US010034354B2

United States Patent
Clout et al.

(10) Patent No.: US 10,034,354 B2
(45) Date of Patent: Jul. 24, 2018

(54) SPLITTABLE LIGHT STRINGS AND METHODS OF SPLITTING LIGHT STRINGS

(71) Applicant: PHILIPS LIGHTING HOLDING B.V., Eindhoven (NL)

(72) Inventors: Ramon Antoine Wiro Clout, Eindhoven (NL); Philip Steven Newton, Waalre (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/323,580

(22) PCT Filed: Jul. 2, 2015

(86) PCT No.: PCT/IB2015/054972
§ 371 (c)(1),
(2) Date: Jan. 3, 2017

(87) PCT Pub. No.: WO2016/001861
PCT Pub. Date: Jan. 7, 2016

(65) Prior Publication Data
US 2017/0150582 A1 May 25, 2017

Related U.S. Application Data

(60) Provisional application No. 62/020,485, filed on Jul. 3, 2014.

(51) Int. Cl.
*H05B 33/08* (2006.01)
*H05B 37/02* (2006.01)
*H04L 29/08* (2006.01)

(52) U.S. Cl.
CPC ......... *H05B 37/0254* (2013.01); *H04L 67/12* (2013.01); *H05B 33/086* (2013.01)

(58) Field of Classification Search
CPC .......................... H05B 37/02; H05B 37/0254; H05B 37/0263; H05B 33/08; H05B 33/086; H04L 67/12; H04L 29/08
See application file for complete search history.

(56) References Cited

U.S. PATENT DOCUMENTS

| 6,016,038 A | 1/2000 | Mueller et al. |
| 6,211,626 B1 * | 4/2001 | Lys ..................... A61N 5/0616 315/291 |

(Continued)

FOREIGN PATENT DOCUMENTS

| EP | 2203032 A2 | 6/2010 |
| WO | 2005089293 A2 | 9/2005 |

(Continued)

OTHER PUBLICATIONS

"How We Built LYT: A Technical View of the Making Process," Blog, Posted by 2storypdx, http://blog.secondstory.com/2013/12/06/how-we-built-lyt-a-technical-view-of-the-making . . . , Dec. 2013 (9 Pages).

(Continued)

*Primary Examiner* — Thai Pham
(74) *Attorney, Agent, or Firm* — Akarsh P. Belagodu

(57) ABSTRACT

A lighting network (110) includes at least one lighting unit (120, 200, 300, 600, 700, 800, 900). The lighting unit includes: a serial data input (121) receiving serial input data including at least first lighting data; first and second demultiplexed serial data outputs (123, 125); one or more individually addressable light sources (222, 322); one or more lighting drivers (250, 460, 650) receiving the first lighting data and in response thereto driving the individually addressable light source(s) to emit light; and a demultiplexer (124, 224, 324, 624). The demultiplexer demultiplexes at least a portion of the serial input data into first and second serial output data, and supplies the first serial output data to (Continued)

the first demultiplexed serial data output to be output from the first lighting unit, and the second serial output data to the second demultiplexed serial data output to be output from the first lighting unit.

20 Claims, 12 Drawing Sheets

(56) References Cited

U.S. PATENT DOCUMENTS

| | | | | |
|---|---|---|---|---|
| 8,810,162 | B2* | 8/2014 | Williams | H05B 33/083 315/169.1 |
| 2003/0057886 | A1* | 3/2003 | Lys | F21V 21/002 315/291 |
| 2011/0121755 | A1* | 5/2011 | Han | H05B 33/0818 315/294 |
| 2012/0189298 | A1* | 7/2012 | Ohad | H05B 37/0263 398/9 |
| 2014/0014839 | A1* | 1/2014 | Chang | G06F 3/017 250/338.4 |
| 2017/0103714 | A1* | 4/2017 | Yamamoto | G02F 1/13306 |

FOREIGN PATENT DOCUMENTS

| | | |
|---|---|---|
| WO | 2009137115 A1 | 11/2009 |
| WO | 2012099632 A1 | 7/2012 |

OTHER PUBLICATIONS

"Adafruit Neopixel Digital RGB LED Strip 144 LED—1M—Schwarz," Exp Tech, http://www.exp-tech.de/zuberhoer/leds/adafruit-neopixel-digital-rgb-led-strip-144-led-1m-schwarz.html, May 2014 (5 Pages).

Microwear, Neopixel Stick—8 X WS2812 5050 RGB LED With Integrated Drivers, http://microwear.com.au/eureka/neopixel-stick-8, May 2014 (4 Pages).

Powering Neopixels, Adafruit Neopixel Uberguide, Adafruit Learning System, https://learn.adafruit.com/adafruit-neopixel-uberguide/power, May 2014 (15 Pages).

* cited by examiner

SPLITTABLE LIGHT STRINGS AND METHODS OF SPLITTING LIGHT STRINGS

CROSS-REFERENCE TO PRIOR APPLICATIONS

This application is the U.S. National Phase application under 35 U.S.C. § 371 of International Application No. PCT/IB2015/054972, filed on Jul. 2, 2015, which claims the benefit of U.S. Patent Application No. 62/020,485, filed on Jul. 3, 2014. These applications are hereby incorporated by reference herein.

TECHNICAL FIELD

The present invention is directed generally to lighting networks. More particularly, various inventive methods and apparatus disclosed herein relate to light strings and methods of configuring light strings.

BACKGROUND

Digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g. red, green, and blue, as well as a processor for independently controlling the output of the LEDs in order to generate a variety of colors and color-changing lighting effects, for example, as discussed in detail in U.S. Pat. Nos. 6,016,038 and 6,211,626, incorporated herein by reference.

Technologies have been created to provide a serial bus for communicating lighting data for controlling addressable LED light sources. Furthermore, light strings which employ LED light sources ("LED light strings"), some of which employ one or more of these serial bus technologies, are becoming widespread. Current technologies include packages containing one or more LEDs, one or more current drivers, and one or more pulse width modulation (PWM) control circuits. This development enables the embedding of such addressable LED light strings in materials, e.g. furniture, textiles such as curtains, wall decorations, etc.

However, existing LED light strings do not allow for splitting of the strings into two or more forks. Especially in the case of an installation, e.g., in an embedded product, of a large number of LED light sources it can be a burden to devise a routing arrangement for the LED light sources by means of a single serial LED light string, or even a plurality of LED light strings all connected in one series path with each other. If the LED light string could be split, then a topology called a "tree" in graph theory could be enabled, thereby expanding the number of possible routings for the LED light sources.

Thus, there is a need in the art provide LED light strings which can be split into two or more forks and connected together in more flexible configurations.

SUMMARY

The present disclosure is directed to inventive methods and apparatus for splitting a light string. For example, in some embodiments, the inventive methods and apparatuses provide splittable LED light strings, LED light "trees" which include two or more separate branches connected to a common controller, and to methods of providing such splittable LED light strings and LED light trees.

Generally, in one aspect, a lighting network includes at least a first lighting unit, the first lighting unit comprising: a serial data input configured to receive first serial input data including at least first lighting data; at least first and second demultiplexed serial data outputs; one or more individually addressable light sources; one or more lighting drivers configured to receive the first lighting data and in response thereto to drive the one or more individually addressable light sources to emit light; and a demultiplexer configured to demultiplex at least a portion of the first serial input data into first serial output data and second serial output data, and connected to supply the first serial output data to the first demultiplexed serial data output to be output from the first lighting unit, and to supply the second serial output data to the second demultiplexed serial data output to be output from the first lighting unit.

In some embodiments, the one or more individually addressable light sources comprises a plurality of individually addressable light sources, and wherein the one or more lighting drivers comprises a plurality of lighting drivers connected in series to the serial data input, each of the lighting drivers being configured to drive a corresponding one of the individually addressable light sources.

In some versions of these embodiments, the lighting unit further comprises a shift register having a serial input connected to an output of one of the lighting drivers and having a serial output connected to an input of the demultiplexer to supply the portion of the first serial input data to the demultiplexer.

In some versions of these embodiments, the lighting unit further comprises a logic circuit has one or more inputs connected to one or more intermediate output signals of the shift register and has an one or more outputs connected to control the demultiplexer to demultiplex the portion of the first serial input data into the first serial output data and the second serial output data.

In some embodiment, the one or more individually addressable light sources comprises a plurality of individually addressable light sources, and wherein the one or more lighting drivers comprises at least one lighting driver which has a plurality of driver outputs which are each configured to drive one of the individually addressable light sources to emit light.

In some versions of these embodiments, the lighting unit further comprises a logic circuit, wherein the at least one lighting driver includes a serial output connected to an input of the demultiplexer, wherein the logic circuit has one or more inputs connected to one of the driver outputs and has an one or more outputs connected to control the demultiplexer to demultiplex the portion of the first serial input data into the first serial output data and the second serial output data.

The some embodiments, the one or more individually addressable light sources comprises a plurality of individually addressable light sources, and wherein the individually addressable light sources each comprise a light emitting diode (LED) light source.

In some versions of these embodiments, the LED light sources each comprise three LEDs which are configured to emit light at different colors from each other, and wherein the first lighting data includes individual LED data for controlling an intensity of each of the three LEDs of each of the LED light sources.

In some embodiments, the lighting network further comprises second and third lighting units. The second lighting unit has a serial data input connected to the first demultiplexed serial data output of the first lighting unit to receive the first serial output data, wherein the first serial output data includes second lighting data. The second lighting unit comprises: one or more individually addressable light sources, and one or more second lighting drivers configured to receive the second lighting data and in response thereto to drive the one or more individually addressable light sources of the second lighting unit to emit light. The third lighting unit has a serial data input connected to the second demultiplexed serial data output of the first lighting unit to receive the second serial output data, wherein the second serial output data includes third lighting data. The third lighting unit comprises: one or more individually addressable light sources, and one or more third lighting drivers configured to receive the third lighting data and in response thereto to drive the one or more individually addressable light sources of the third lighting unit to emit light.

In some versions of these embodiments, the lighting network further comprises a controller connected to the serial data input of the first lighting unit, wherein the controller is configured to generate the first, second, and third lighting data for the first, second, and third lighting units and to transmit the first, second, and third lighting data to the first lighting unit as the first serial input data.

In some versions of these embodiments, the first, second, and third lighting units each include a power input configured to receive power for operating first, second, and third lighting units, respectively, wherein the first lighting unit includes first and second power outputs, and wherein the first power output of the first lighting unit is connected to the power input of the second lighting unit and the second power output of the first lighting unit is connected to the power input of the third lighting unit.

In another aspect, a method comprises: receiving first serial input data, including at least first lighting data, at a data input of a first lighting unit; employing the first lighting data to drive one or more individually addressable light sources of the first lighting unit to cause the one or more individually addressable light sources to emit light; demultiplexing at least a portion of the first serial input data into first serial output data and second serial output data; outputting the first serial output data from the first lighting unit at a first demultiplexed serial data output; and outputting the second serial output data from the first lighting unit at a second demultiplexed serial data output.

In some embodiments, a plurality of lighting drivers are connected in series to the serial data input, the method including each of the lighting drivers driving a corresponding one of the individually addressable light sources.

In some versions of these embodiments, the method further comprises employing a shift register and a demultiplexer, the shift register having a serial input connected to an output of one of the lighting drivers and having a serial output connected to an input of the demultiplexer, the method further comprising the shift register supplying the portion of the first serial input data to the demultiplexer.

In some versions of these embodiments, the method further comprises employing one or more intermediate output signals of the shift register to control the demultiplexer to demultiplex the portion of the first serial input data into the first serial output data and the second serial output data.

In some embodiments, the method further includes one lighting driver which has a plurality of driver outputs driving each of the plurality of the individually addressable light sources via one of the driver outputs.

In some versions of these embodiments, the method further comprises employing a logic circuit and a demultiplexer, wherein the logic circuit has one or more inputs connected to one of the driver outputs and has an one or more outputs, the method comprising the lighting driver providing the portion of the first serial input data to an input of the demultiplexer, and the logic circuit controlling the demultiplexer to demultiplex the portion of the first serial input data into the first serial output data and the second serial output data.

In some embodiments, the method further includes a second lighting unit receiving at a serial data input thereof the first serial output data of the first lighting unit, wherein the first serial output data includes second lighting data; the second lighting driving one or more individually addressable light sources of the second lighting unit to emit light; a third lighting unit receiving at a serial data input thereof the second serial output data of the first lighting unit, wherein the second serial output data includes third lighting data; and the third lighting driving one or more individually addressable light sources of the third lighting unit to emit light.

In some versions of these embodiments, the first, second, and third lighting units each include a power input, and the first lighting unit includes first and second power outputs, the method including the first lighting input supplying power from the first power output to the power input of the second lighting unit, and the first lighting input supplying power from the second power output to the power input of the third lighting unit.

In yet another aspect, an apparatus comprises: a serial data input configured to receive serial input data including lighting data for a plurality of individually addressable light sources; at least first and second demultiplexed serial data outputs; a demultiplexer having one or more control inputs, a serial input, and at least first and second demultiplexer outputs; and a control device having one or more control outputs connected to the one or more control inputs of the demultiplexer, the control device being connected to produce one or more control signals in response to the serial input data and to supply the one or more control signals to the demultiplexer, wherein the demultiplexer is configured, in response to the one or more control signals, to demultiplex at least a portion of the serial input data into first serial output data and second serial output data, and to supply the first serial output data to the first demultiplexed serial data output to be output from the first lighting unit, and to supply the second serial output data to the second demultiplexed serial data output to be output from the first lighting unit.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. Black body radiator color temperatures generally fall within a range of from approximately 700 degrees K (typically considered the first visible to the human eye) to over 10,000 degrees K; white light generally is perceived at color temperatures above 1500-2000 degrees K.

Lower color temperatures generally indicate white light having a more significant red component or a "warmer feel," while higher color temperatures generally indicate white light having a more significant blue component or a "cooler feel." By way of example, fire has a color temperature of approximately 1,800 degrees K, a conventional incandescent bulb has a color temperature of approximately 2848 degrees K, early morning daylight has a color temperature of approximately 3,000 degrees K, and overcast midday skies have a color temperature of approximately 10,000 degrees K. A color image viewed under white light having a color temperature of approximately 3,000 degree K has a relatively reddish tone, whereas the same color image viewed under white light having a color temperature of approximately 10,000 degrees K has a relatively bluish tone.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., lighting data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

As used herein, "lighting data" refers to data which conveys information regarding how one or more light sources should be controlled to emit light with a selected intensity and/or color. Lighting data may divided separate packets of data each corresponding to one of a plurality of light sources, with each packet conveying information for controlling the intensity and/or color of light emitted by the corresponding light source. For example, where a light source is an LED-based light source having separate red, green, and blue LEDs, the lighting data for that light source may include a first set of N (e.g., N=8) bits of data for setting the intensity of the red LED(s), a second set of N bits of data for setting the intensity of the green LED(s), and a third set of N bits of data for setting the intensity of the blue LED(s), for example by setting a dimming level for each of the different colored LEDs.

As used herein, a "light string" refers to an arrangement of light sources wherein lighting data for controlling light sources passes in series from a first control device (e.g., driver) for one or more first light sources, to a second control device for one or more second light sources, to a third control device for one or more third light sources, etc.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

In the case of an installation, e.g., in an embedded product, of a large number of LED light sources it can be a burden to devise a routing arrangement for the LED light sources by means of a single serial LED light string, or even a plurality of LED light strings all connected in one series path with each other.

More generally, Applicants have recognized and appreciated that it would be beneficial to be able to split an LED light string so that a "tree" topology could be enabled, thereby expanding the number of possible routings for the LED light sources.

In view of the foregoing, various embodiments and implementations of the present invention are directed to LED light strings which can be split into two or more forks and connected together in more flexible configurations, to LED lighting networks which employ one or more splittable LED light strings, and to methods of splitting an LED light string.

Figure 1:
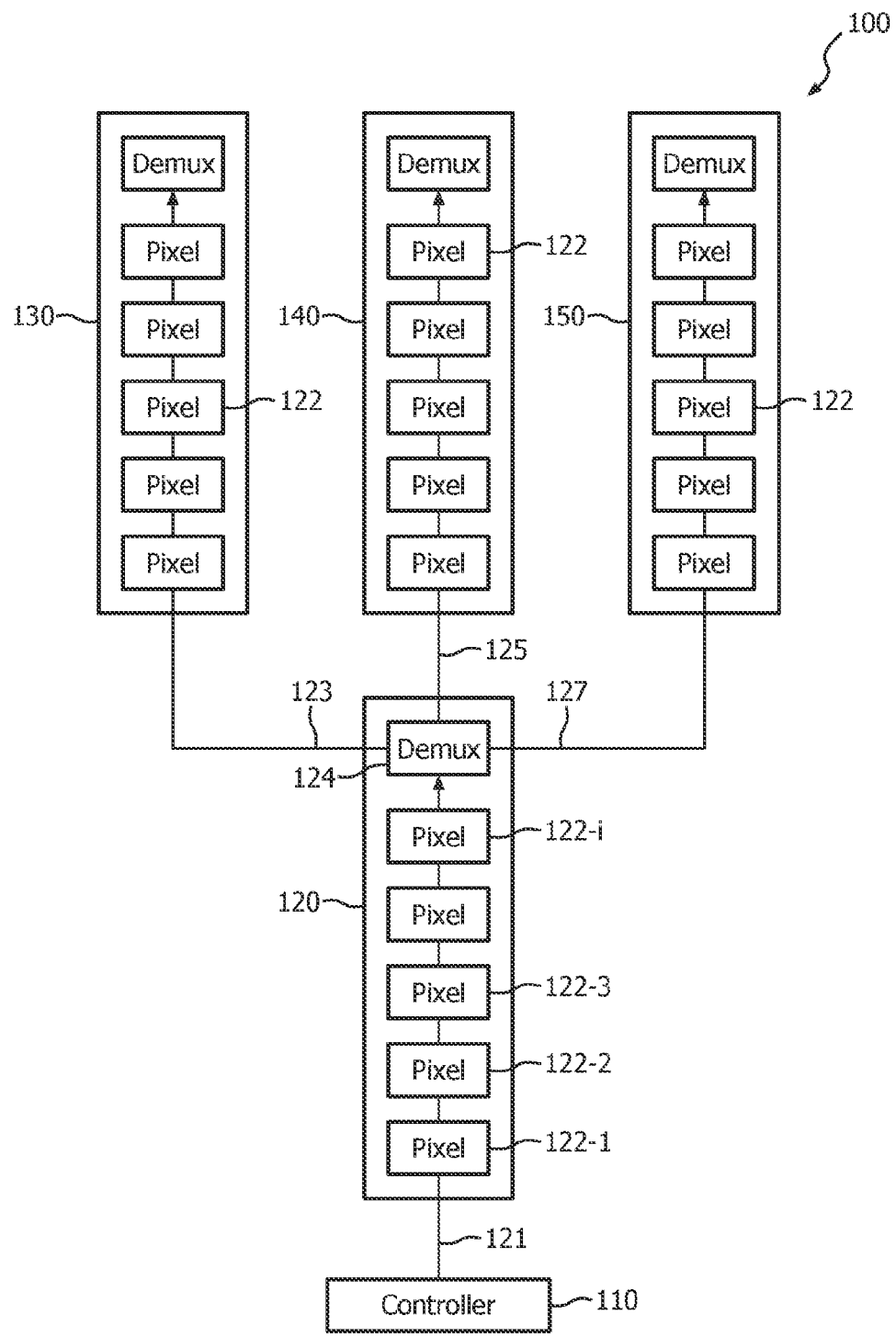
FIG. 1 illustrates an example of a lighting arrangement including a plurality of light units.

FIG. 1 illustrates an example of a lighting arrangement including a plurality of light units. In particular, FIG. 1 illustrates a lighting network 100 which includes a controller 110, and first, second, third and fourth lighting units 120, 130, 140 and 150, respectively. Although not shown in FIG. 1, controller 110 (which also may be referred to as a lighting controller) may include a processor and memory and may include or be connected to a user interface for allowing a user to set, control, or adjust one of more parameters or lighting characteristics of lighting network 100. First lighting unit 120 has an input 121 connected to an output of controller 110 and has a plurality of demultiplexed outputs 123, 125 and 127 connected respectively to inputs of second, third, and fourth lighting units 130, 140 and 150.

First, second, third and fourth lighting units 120, 130, 140 and 150 each include a plurality of pixels 122. For simplicity of illustration, not all of the pixels 122 in FIG. 1 are numerically labeled. Each pixel 122 comprises an individually addressable light source, which in some embodiments may comprise one or more LEDs. In some embodiments, each pixel 122 may comprise a white LED. In some embodiments, each pixel 122 may comprise one or more red LEDs, one or more green LEDs, and one or more blue LEDs which can be combined together to produce light having a desired color, including white light having a desired color temperature. In general, first, second, third and fourth lighting units 120, 130, 140 and 150 may have the same or different numbers of pixels 122 as each other.

FIG. 1 show the pixels 122 arranged in series with each other, with the output of a preceding pixel being connected to an input of a subsequent pixel in the string.

In lighting network 100, at least first lighting unit 120 further comprises a demultiplexer 124 having an input connected to an output of a preceding pixel 122-i, and having three outputs, each of which is connected to one of the demultiplexed outputs 123, 125 and 127 of first lighting unit 120. In lighting network 100, second and third lighting units 130 and 140 also include a demultiplexer, while fourth lighting unit 150 does not include a demultiplexer. However in general, any or all of second, third and fourth lighting units 130, 140 and 150 could include a demultiplexer or not include a demultiplexer. In that case, one or more additional lighting units may be connected to the outputs of any or all of these demultiplexers to further extend lighting network 100 into a general tree structure, as desired for any particular installation.

Also it should be understood that while demultiplexer 124 illustrated in FIG. 1 is a three way demultiplexer, in general an M-way demultiplexer may be employed, where M may be any integer greater than or equal to 2. Furthermore, a lighting unit may include two or more demultiplexers, which may or may not be concatenated together, and different lighting units in lighting network 100 may include different demultiplexers having different numbers of outputs.

In operation, controller 110 communicates lighting data to first lighting unit 120 for each of the pixels 122 of first lighting unit 120 and for second, third, and fourth lighting units 130, 140 and 150. The lighting data for lighting network 100 may be determined by controller 110 in response to a preprogrammed operating parameters for network 100 and/or in response to input received from a user via a user interface. In embodiments described below, the lighting data is communicated from controller 110 to first lighting unit 120 via a serial data communication protocol which may comply with one of various standard digital lighting communication protocols. Further details of an example communication protocol will be explained below with respect to FIGS. 4 and 5.

In some embodiments, each of the pixels 122 may include an individual lighting driver in addition to the light source.

In that case, the lighting driver for a first pixel 122-1 in first lighting unit 120 may receive serial input data from controller 110. Here it is understood that the serial data may be communicated together with a clock signal for sampling the data, which clock signal may be communicated on a separate line from the data, or may be embedded within the data signal. The serial data received by first pixel 122-1 from controller 110 may include lighting data for all of the pixels 122 in lighting network 100. The lighting driver for first pixel 122-1 may use the lighting data for first pixel 122-1 to control the lighting source of first pixel 122-1 to have a desired intensity and/or color. For example, in some embodiments where the light source is an LED-based light source having separate red, green, and blue LEDs, the lighting data may include a first set of N (e.g., N=8) bits of data for setting the intensity of the red LED(s), a second set of N bits of data for setting the intensity of the green LED(s), and a third set of N bits of data for setting the intensity of the blue LED(s). Here it is understood that setting the intensity for each of the different colored LEDs can be considered the same as setting a dimming level for each of the different colored LEDs. By appropriately choosing the lighting data for each of the different colors for a given pixel 122, a desired combined color for the pixel 122 may be selected, a desired combined intensity may be selected, a desired color point of white light for the pixel may be selected, etc. By appropriately choosing the lighting data for all of the pixels 122 to cause each pixel 122 to have a desired color/intensity/color point/etc., controller 110 may control lighting network 100 to produce a wide variety of lighting effects.

The lighting driver for first pixel 122-1 may also serially communicate data received from controller 110 to the lighting driver for a second pixel 122-2, together with a clock signal as noted above. The serial data output by first pixel 122-1 may include lighting data for all of the other pixels in lighting network 110. In some embodiments, the serial data output by lighting driver for first pixel 122-1 may not include the lighting data for first pixel 122-1. That is, the lighting driver for first pixel 122-1 may strip off the lighting data for first pixel 122-1 before forwarding the serial data stream to the lighting driver for second pixel 122-2. First pixel 122-1 may also inhibit outputting to second pixel 122-2 the clock signal for the lighting data for the first pixel 122-1. Similarly, the lighting driver for second pixel 122-2 may use the lighting data for second pixel 122-2 to control the lighting source of second pixel 122-2 to have a desired intensity and/or color, and may output a serial data stream to the lighting driver for a third pixel 122-3, where the serial data stream includes the lighting data for all of the remaining pixels 122 in lighting network 110, but does not include the lighting data (and associated clock) for first and second pixels 122-1 and 122-2. This process may be repeated in series for all pixels 122, and thus the lighting data may be serially communicated to all of the pixels 122 in first lighting unit 120.

As noted above, first lighting unit 120 also includes demultiplexer 124. Demultiplexer 124 of first lighting unit 120 receives lighting data from the lighting driver from an adjacent pixel 122-i and demultiplexes the received lighting data into three serial data streams to be distributed to second, third, and fourth lighting units 130, 140 and 150. In some embodiments, lighting data for each pixel 122 may be organized into a data packet, and the serial data stream may therefore comprise a series of data packets. In that case, demultiplexer 124 may demultiplex the serial data so as to send every third data packet of lighting data of the serial data stream which it receives to each of the three demultiplexed outputs 123, 125 and 127 and thereby to second, third, and fourth lighting units 130, 140 and 150. In other embodiments, demultiplexer 124 may have information or data identifying the number of pixels 122 which are connected to each of the three demultiplexed outputs 123, 125 and 127. In that case, demultiplexer 124 may sequentially output serial data including all of the data packets for all of the pixels 122 of second lighting unit 130 first, then output all of the data packets for all of the pixels 122 of third lighting unit 140 next, and then finally output all of the data packets for all of the pixels 122 of fourth lighting unit 150 last (of course the order may be changed).

Although not shown in FIG. 1, in some embodiments first lighting unit 120 may have a power input for receiving power for operating first lighting unit 120, and may further include power outputs for supplying a portion of the received power to second, third, and fourth lighting units 130, 140 and 150. In that case, first lighting unit 120 may receive power from controller 110, or from a separate power supply, including for example AC mains. In general the received power may be received in the form of an AC power or DC power.

As described above, in some embodiments each of the pixels 122 of a lighting unit may include an individual lighting driver in addition to the light source. However in other embodiments one lighting driver may be provided for driving the light source for more than one pixel of a lighting unit. In that case, each lighting driver other than the first lighting driver in the tree which is connected to controller 110 may receive serial data from controller 110 via another lighting driver which is located adjacent "upstream" in the serial path with respect to controller 110 and my output serial data to yet another lighting driver which is located "downstream" in the serial path with respect to controller 110.

In some embodiments, first lighting unit 120 and additional lighting units 130 each comprise a light string, in particular a light emitting diode (LED) light string. In some embodiments, each of the light strings may include a separate substrate on which the lighting driver(s) and LED-based light sources are provided. In some embodiments, each of the light strings may further include one or more input/output connectors and/or a housing in which the pixels 122 are provided. For example, in some embodiments first lighting unit may include separate connectors for input 121, demultiplexed output 123, demultiplexed output 125 and demultiplexed output 127. In other embodiments, one or more of these connectors may be combined. Also, one or more of these input/output connectors may provide power input or output as described above, or separate power connectors may be provided for the power input and outputs. Any of all of these connectors may be provided on a substrate or housing which also supports the pixels 122 including their light sources and any lighting driver(s).

In some embodiments, one or more of lighting units 120, 130, 140 and 150 may be fabricated as part of a longer lighting strip which is cut during manufacturing to produce lighting units which have a desired number of pixels and/or demultiplexers.

Example embodiments of a lighting unit such as first lighting unit 120 will now be described.

Figure 2:
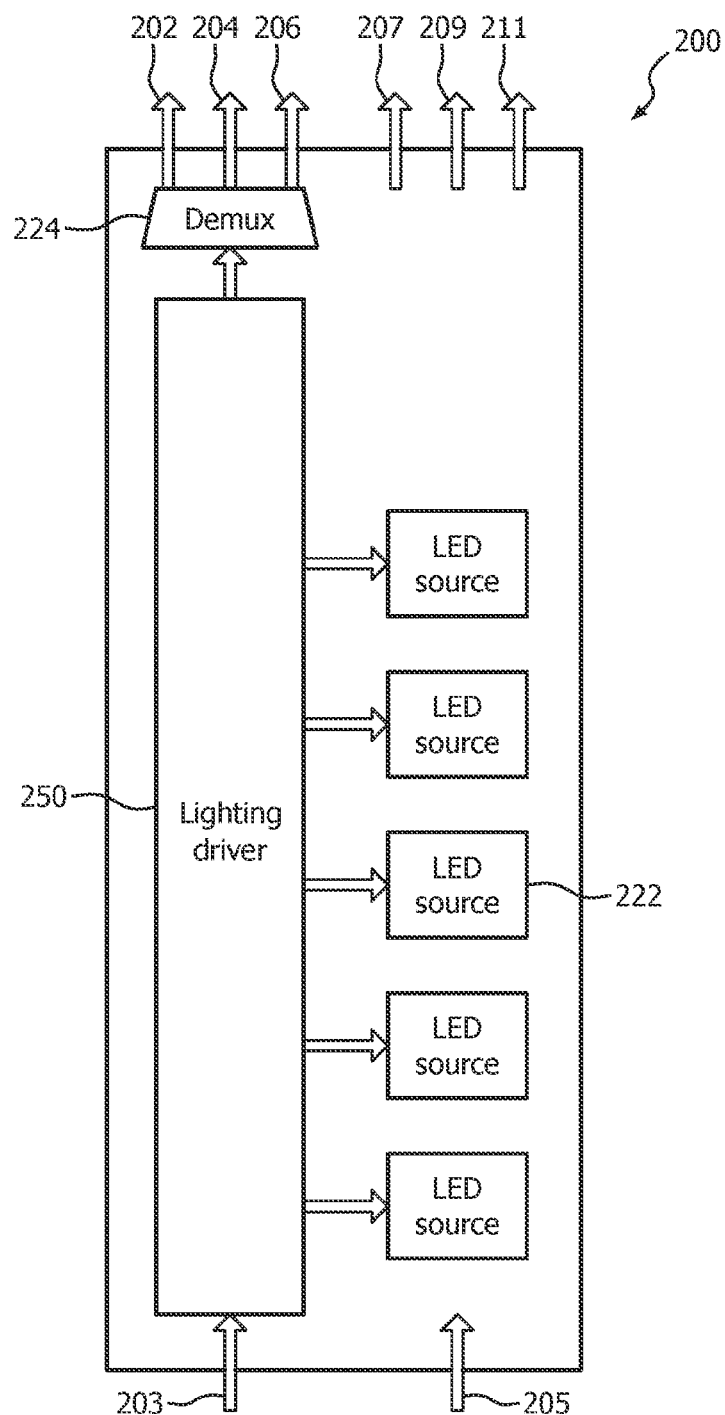
FIG. 2 illustrates an example embodiment of a lighting unit configured as a light emitting diode (LED) light string.

FIG. 2 illustrates an example embodiment of a lighting unit 200 configured as a light emitting diode (LED) light string. Lighting unit 200 may be one embodiment of lighting unit 120 of lighting network 100. Lighting unit 200 includes a serial data input 203, first, second and third demultiplexed serial data outputs 202, 204 and 206, a plurality of individually addressable light sources (here LED-based light sources) 222, a lighting driver 250, and a demultiplexer 224. Lighting unit 200 also includes a power input 205 and first, second and third power outputs 207, 209 and 211. In some embodiments first, second and third power outputs 207, 209 and 211 may be omitted.

In some embodiments, each of the LED-based light sources 222 may comprise an LED, or a plurality of LEDs which are driven together, to produce light of a single color (e.g., white). In other embodiments, such as will described below in more detail with respect to FIG. 3, each of the LED-based light sources 222 may comprise separate red, green, and blue LEDs, or separate groups of red, green, and blue LEDs, each of which colors may be driven together.

In operation, lighting unit 200 receives serial input data at a serial data input 203 and outputs first, second, and third serial output data at first, second, and third demultiplexed serial data outputs 202, 204 and 206. More specifically, serial data input 203 receives serial input data (for example, from controller 110) and provides the serial data, including first lighting data for LED-based light sources 222, to lighting driver 250. Here it is understood that the serial data may be received together with a clock signal for sampling the data, which clock signal may be communicated on a separate line from the data, or may be embedded within the data signal. In some embodiments, the serial input data may be received via a pair of lines including a data line and a clock line. In other embodiments, the serial data input may include a single line and a clock signal for clocking the data may be included with the data signal, for example by using an RZ data format, Manchester encoding, etc.

In response to the first lighting data, lighting driver 250 drives LED-based light sources 222 to emit light. In some embodiments, lighting driver 250 may generate and output a pulse width modulated (PWM) current for driving each LED, or group of commonly driven LEDs, of LED-based light source 222.

Lighting driver 250 also outputs at least a portion of the serial data (and associated clock) received at serial data input 203. In some embodiments, lighting driver 250 may output all of the serial data received at serial data input 203 except for the first lighting data which it employed to drive LED-based light sources 222. In that case, lighting driver may also inhibit outputting the clock signal for the first lighting data.

Demultiplexer 224 includes a serial input, first, second and third demultiplexer outputs, and one or more control inputs (not shown in FIG. 2). Demultiplexer 224 receives the portion of the serial data output by lighting driver 250 and demultiplexes the received portion of the serial input data into first serial output data, second serial output data, and third serial output data. Demultiplexer 224 supplies the first serial output data to the first demultiplexed serial data output 202 to be output from lighting unit 200, supplies the second serial output data to the second demultiplexed serial data output 204 to be output from lighting unit 200, and supplies the third serial output data to the third demultiplexed serial data output 206 to be output from lighting unit 200.

Also, in some embodiments power input 206 may receive power for operating lighting unit 200, and may supply a portion of the received power to other lighting units via first, second, and third power outputs 207, 209 and 211. In general the received power may be received in the form of an AC power or DC power.

When constructing a lighting network, each of first, second, and third demultiplexed serial data outputs 202, 204 and 206 may be connected to a serial data input of another lighting unit 200, as illustrated in FIG. 1.

Although lighting unit 200 shown in FIG. 2 includes one demultiplexer 224, one lighting driver 250, and five LED sources 222, in general any number of LED sources may be included, and more than one demultiplexer 224 and lighting driver 250 may be included. Furthermore, the order of demultiplexer 224 and lighting driver 250 may be reversed, with one of the demultiplexer outputs of demultiplexer 224 being supplied to the input of lighting driver 250. Furthermore, although the illustrated demultiplexer 224 is a three way demultiplexer, in general demultiplexer 224 may be an M-way demultiplexer, where M may be any integer greater than or equal to two.

Figure 3:
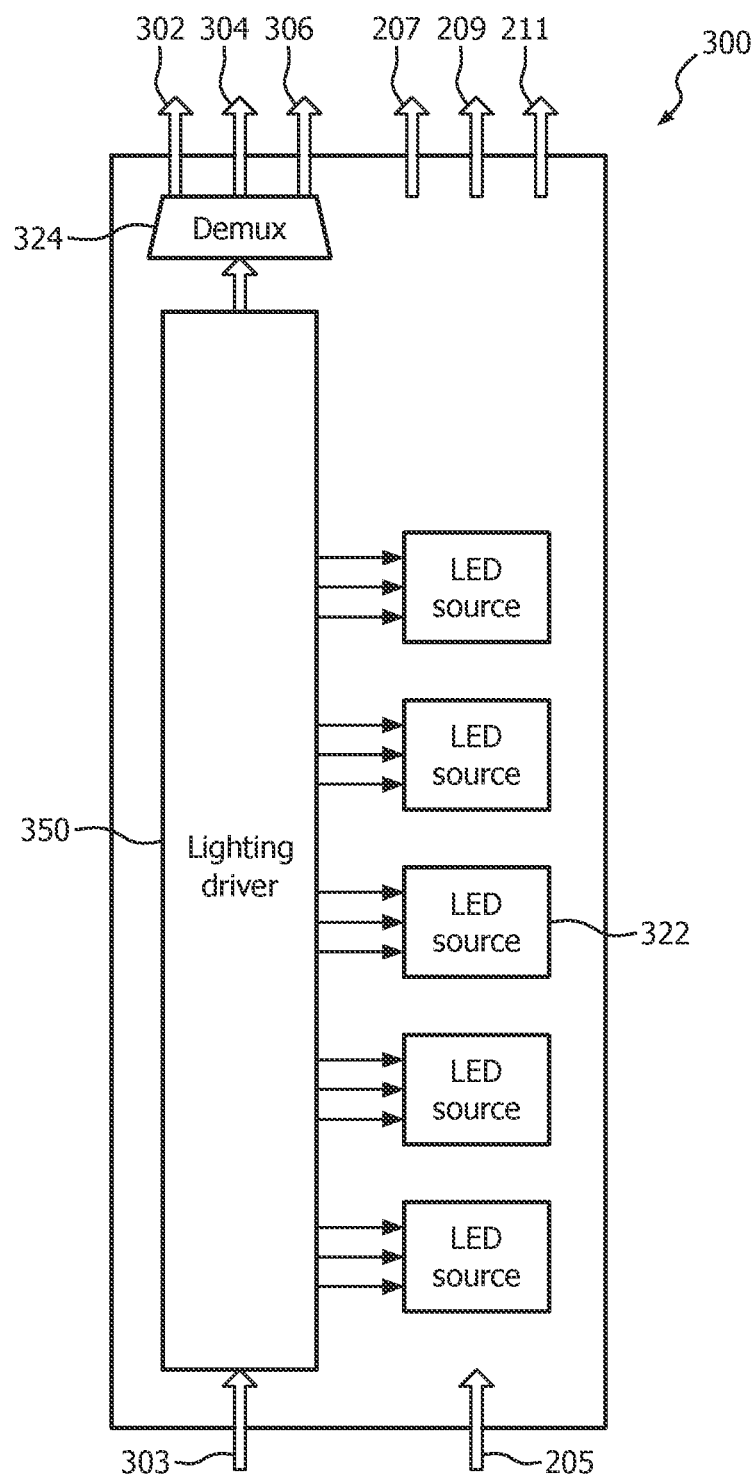
FIG. 3 illustrates another example embodiment of a lighting unit configured as an LED light string.

FIG. 3 illustrates another example embodiment of a lighting unit 300 configured as an LED light string. Lighting unit 300 includes a serial data input 303, first, second and third demultiplexed serial data outputs 302, 304 and 306, a plurality of individually addressable light LED-based light sources 322, a lighting driver 350, and a demultiplexer 324. Lighting unit 200 also includes a power input 205 and first, second and third power outputs 207, 209 and 211. In some embodiments first, second and third power outputs 207, 209 and 211 may be omitted.

In operation serial data input 303 receives serial input data and provides the serial data, including first lighting data for LED-based light sources 322, to lighting driver 350. As in the case of lighting unit 200 of FIG. 3, in some embodiments of lighting unit 300 the serial input data may be received via a pair of lines including a data line and a clock line. In other embodiments, the serial data input may include a single line and a clock signal for clocking the data may be included with the data signal, for example by using an RZ data format, Manchester encoding, etc.

Lighting unit 300 may be one embodiment of lighting unit 200 wherein each of the LED-based light sources 322 has three individually controllable colors or channels, as illustrated in FIG. 3. For example, each of the LED-based light sources 322 may comprise separate red, green, and blue LEDs, or separate groups of red, green, and blue LEDs, each of which colors may be driven together. In that case, the lighting data may include a first set of N (e.g., N=8) bits of data for setting the intensity of red LED(s), a second set of N bits of data for setting the intensity of the green LED(s), and a third set of N bits of data for setting the intensity of the blue LED(s). In some embodiments, lighting driver 350 may generate and output a pulse width modulated (PWM) current for driving each LED, or group of commonly driven LEDs, of LED-based light source 322.

The rest of the details of the configuration and operation of lighting unit 300 are the same as those of lighting unit 200 described above, and therefore will not be repeated.

Figure 4:
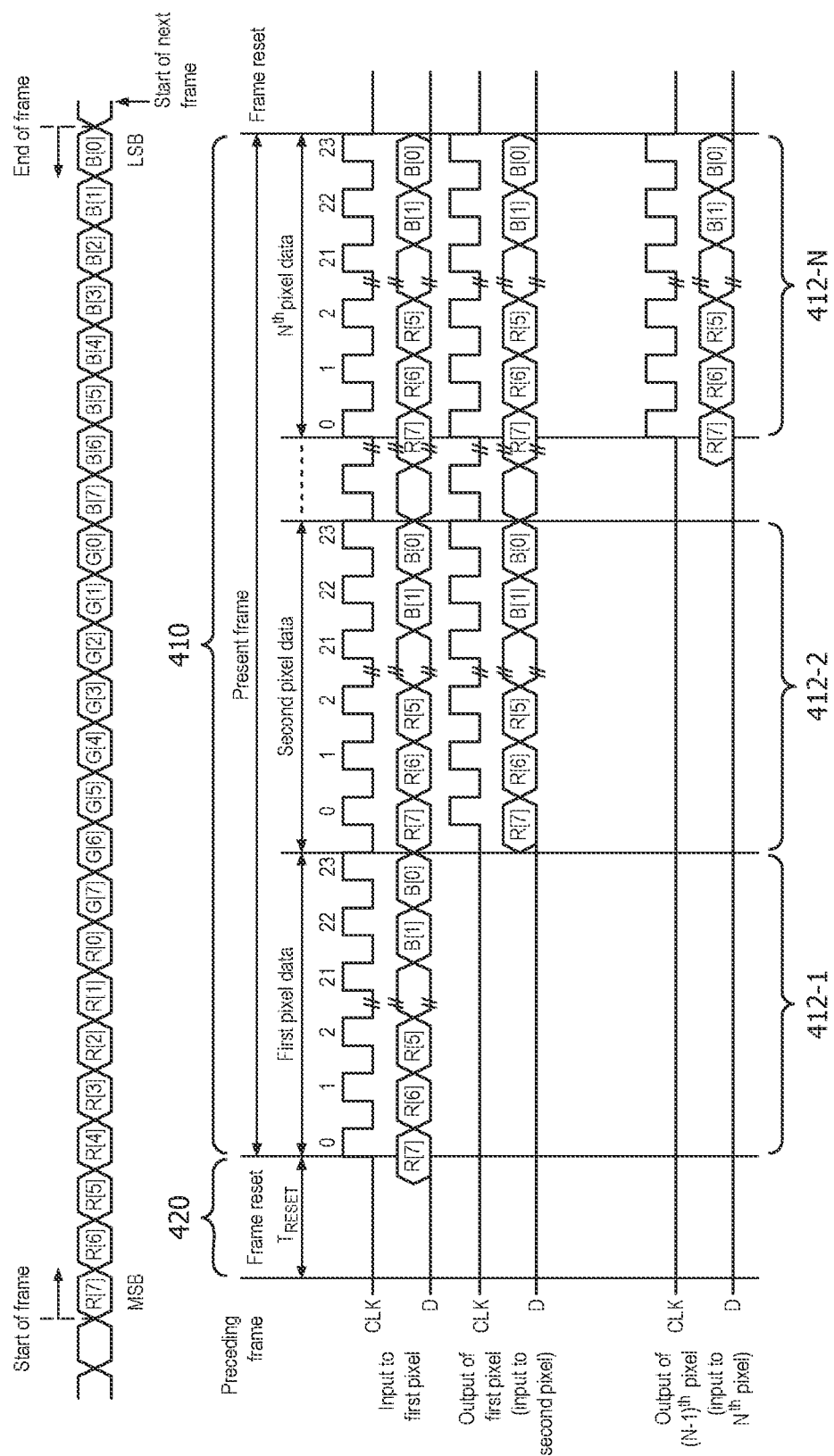
FIG. 4 is a timing diagram for illustrating one example embodiment of a communication protocol for a lighting network including one or more light strings.

FIG. 4 is a timing diagram for illustrating one example embodiment of a communication protocol for a lighting network, such as lighting network 100, including one or more light strings, such as lighting unit 120, 200 or 300. Here it is assumed that the lighting network includes a plurality ("N") of pixels arranged in series with each other, with the output of a preceding pixel being connected to an input of a subsequent pixel in the string. That is, serial data (and an associated clock) is output from each preceding pixel to each subsequent pixel in the string. More specifically, the lighting driver for the first pixel has a serial data input and a clock input for receiving serial data from a controller, such as controller 110 in FIG. 1. The lighting driver for the first pixel also has a serial data output and a clock output which are connected to a data input and clock input of the second pixel. Similarly, the lighting driver for the second pixel has a serial data input and a clock input for receiving serial data from the first pixel. The lighting driver for the second pixel also has a serial data output and a clock output which are connected to a serial data input and clock input of the third pixel, and so on throughout the light string.

According to the protocol illustrated in FIG. 4, lighting data for all of the pixels of the network is communicated from the controller to the pixels in each of a series of frames 410 which are separated from each other by a frame reset period 420. Within each frame 410 a plurality of data packets 412 of lighting data are communicated sequentially or in series, one data packet for each pixel in the lighting network. Here each data packet 412 includes 24 data bits of lighting data, including: 8 bits of data indicating an intensity (or, conversely, a dimming level) for the red LEDs of the pixel; 8 bits of data indicating an intensity (or, conversely, a dimming level) for the green LEDs of the pixel; and 8 bits of data indicating an intensity (or, conversely, a dimming level) for the blue LEDs of the pixel. In the protocol illustrated in FIG. 4, the serial data is validated and clocked in on the rising edge of a clock signal CLK which may be communicated on a separate line from the serial data.

As shown in FIG. 4, the first pixel in the lighting network (e.g., the pixel most immediately connected to the controller, such as pixel 122-1 in FIG. 1), and more specifically the lighting driver for the first pixel, receives the lighting data for all of the N pixels in the lighting network from the controller within each frame 410, beginning with a first data packet 412-1 including the lighting data for the first pixel, and ending with an Nth data packet 412-N including the lighting data for the Nth pixel. The lighting driver for the first pixel is easily able to recognize the first data packet 412-1 in the frame 410 which includes the lighting data for the first pixel due to the immediately-preceding frame reset period 420 during which the clock signal CLK is maintained low indicating the beginning of a new frame 410. The lighting driver for the first pixel uses the lighting data in the first data packet 412-1 to control the LED-based light source of the first pixel.

As noted above, the lighting driver for the first pixel has a serial data output and a clock output which are connected to a serial data input and clock input of the second pixel. However, the lighting driver for the first pixel does not output the first data packet 412-1 of frame 410 to the second and subsequent pixels. More specifically, the lighting driver for the first pixel maintains its serial data output line and its clock line low for the time period of first data packet 412-1.

After receiving the first data packet 412-1, the lighting driver for the first pixel receives the next data packet 412-2 which includes lighting data for the next (second) pixel. Here, the lighting driver for the first pixel recognizes that the next data packet 412-2 does not include lighting data for the first pixel (because it was not immediately preceded by the frame reset period 420) and accordingly outputs the data packet 412-2 and associated clock to the second pixel, or more specifically the lighting driver for the second pixel.

Meanwhile, since the lighting driver for the first pixel did not output the first data packet 412-1 and maintained its output clock line low for the first data packet 412-1, the "first" data packet of the frame 410 which is received by the second pixel is the second data packet 412-2. Since this immediately follows an extended period where the input clock line for the second pixel has been maintained low, indicating a frame reset, the lighting driver operates similarly to the operation of the lighting driver for the first pixel explained above, and recognizes that the second data packet 412-2 includes the lighting data for the second pixel uses the lighting data in the second data packet 412-2 to control the LED-based light source of the second pixel. Meanwhile, the lighting driver for the second pixel maintains its serial data output line and its clock line low for the time period of the first and second data packets 412-1 412-2. The lighting drivers for the third and subsequent pixels operate similarly to the lighting driver of the second pixel, and accordingly the lighting data for all of the pixels of the lighting network is serially distributed.

The communication protocol illustrated and described with respect to FIG. 4 employs separate data and clock lines. However it should be understood that in other embodiments lighting network 100 and lighting units 120, 200 and 300 could operate with a communication protocol wherein the clock and data signals are communicated over a shared line.

Figure 5:
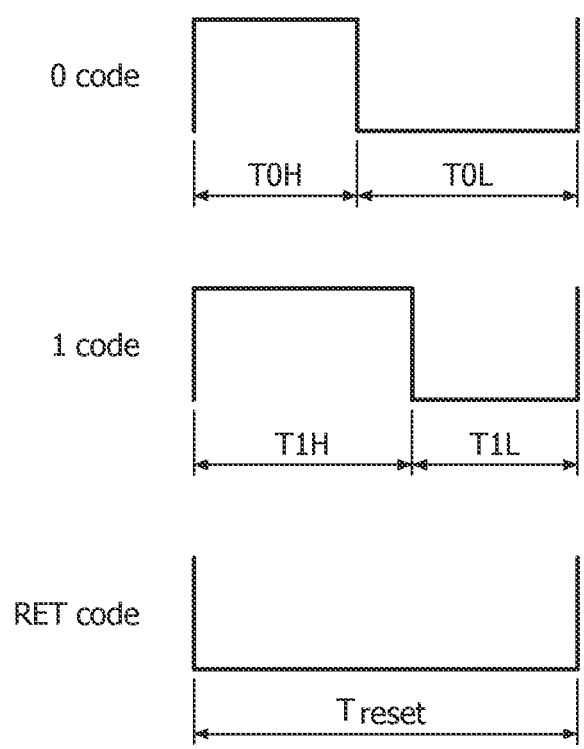
FIG. 5 is a diagram for illustrating data patterns for a communication protocol for a lighting network.

FIG. 5 is a diagram for illustrating data patterns for a communication protocol for a lighting network wherein data and clock are communicated in a shared line, referred to as an encoded data line. Here it is seen that each data bit, whether it be a data "1" or a "0," includes a transition of the encoded data line from a high voltage level to a low voltage level within the bit interval, thereby carrying the clock frequency. In this case the data is communicated by the relative lengths of the time of that the encoded data line is at the high voltage level and the low voltage level within each bit interval being different for a data "1" than for a "0." It is also seen in FIG. 5 that a frame reset period may be clearly indicated by maintaining the encoded data line at the same voltage level (here the low voltage level) for an extended period of time which exceeds (preferably greatly exceeds) the period of one bit interval.

Figure 6:
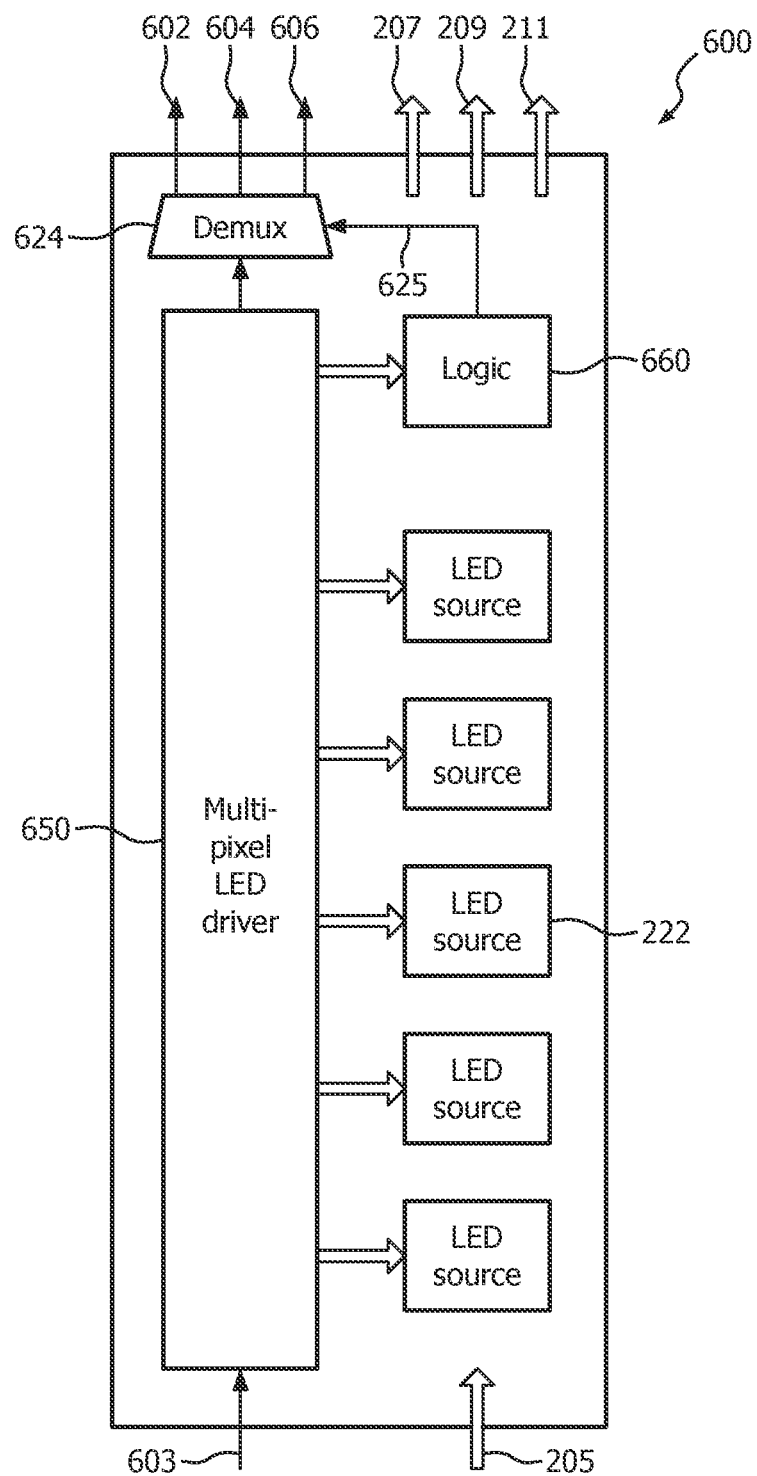
FIG. 6 illustrates another example embodiment of a lighting unit configured as an LED light string.

FIG. 6 illustrates another example embodiment of a lighting unit 600 configured as an LED light string. Lighting unit 600 includes a serial data input 603, first, second and third demultiplexed serial data outputs 602, 604 and 606, a plurality of individually addressable light LED-based light sources 322, a multi-pixel LED lighting driver 650, logic 660, and a demultiplexer 624. Lighting unit 600 also includes a power input 205 and first, second and third power outputs 207, 209 and 211. In some embodiments first, second and third power outputs 207, 209 and 211 may be omitted.

In operation serial data input 603 receives serial input data and provides the serial data, including first lighting data for LED-based light sources 622, to multi-pixel LED lighting driver 650.

Lighting unit 600 may be one embodiment of lighting unit 300 as described above wherein the serial input data is received at serial data input 603 via a pair of lines including a data line and a clock line according to the protocol illustrated and described above with respect to FIG. 4. In that case, it should be understood that demultiplexer 624 may be considered to operate as a first demultiplexer for the serial data and a second demultiplexer for the clock signal. Demultiplexer 624 may include a serial input, first, second and third demultiplexer outputs, and one or more control inputs or selector inputs 625. Furthermore, each of the first, second and third demultiplexed serial data outputs 602, 604 and 606 may be considered as comprising two separates lines, including a data line which conveys demultiplexed data and a clock line, which conveys a demultiplexed clock signal.

In lighting unit 600, multi-pixel LED lighting driver 650 is provided with a plurality of outputs which are each configured for driving a plurality of LED-based light sources 322, for example a plurality of LED-based light sources which each include separate red, green, and blue LEDs, or separate groups of red, green, and blue LEDs. In some embodiments, lighting driver 650 may generate and output a pulse width modulated (PWM) current for driving each LED, or group of commonly driven LEDs, of LED-based light source 322.

In lighting unit 600, one of the outputs of multi-pixel LED lighting driver 650 which is configured for driving one LED-based light source 322 is instead employed to control the demultiplexing operation of demultiplexer 624. In particular, one of the outputs of multi-pixel LED lighting driver 650 which is configured for driving one LED-based light source 322 is instead provided to logic circuitry 660 to produce one or more control signals which are provided to a selector input 625 of demultiplexer 624 for controlling the demultiplexing operation of demultiplexer 624. Further details of an example embodiment of the logic for producing the one or more control signals for controlling the demultiplexing operation of demultiplexer 624 will be described below with respect to FIGS. 10A and 10B.

The rest of the details of the configuration and operation of lighting unit 600 are the same as those of lighting unit 200 described above, and therefore will not be repeated.

Figure 7:
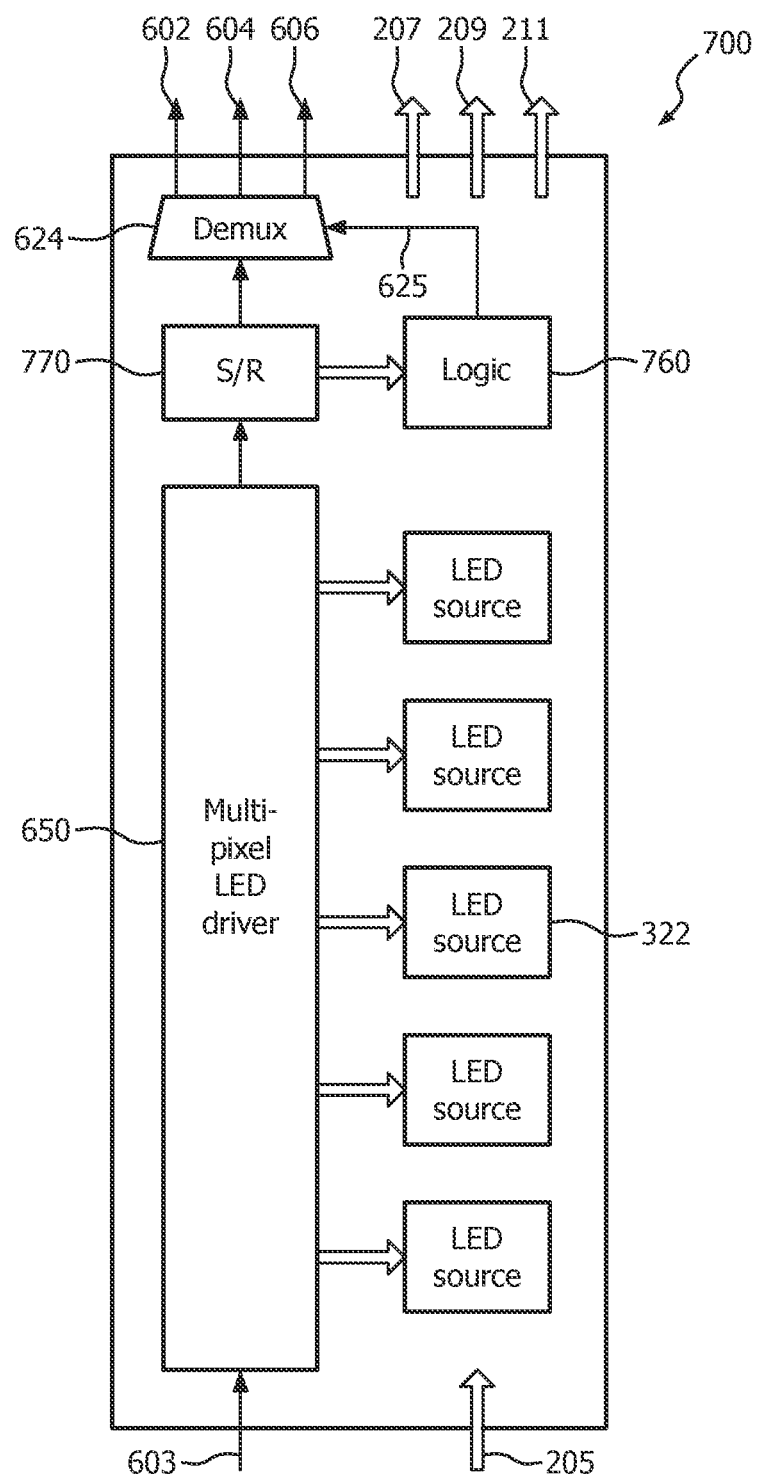
FIG. 7 illustrates another example embodiment of a lighting unit configured as an LED light string.

FIG. 7 illustrates another example embodiment of a lighting unit 700 configured as an LED light string. Lighting unit 700 includes serial data input 603, first, second and third demultiplexed serial data outputs 602, 604 and 606, a plurality of individually addressable light LED-based light sources 322, a multi-pixel LED lighting driver 650, logic 760, a shift register 770, and demultiplexer 624. Lighting unit 700 also includes a power input 205 and first, second and third power outputs 207, 209 and 211. In some embodiments first, second and third power outputs 207, 209 and 211 may be omitted.

Lighting unit 700 is similar to lighting unit 600, and so only differences in the construction and operation will be described.

In lighting unit 700, all of the plurality of outputs of multi-pixel LED lighting driver 650 which are configured for driving a plurality of LED-based light sources 322 are used to drive LED-based light sources 322, and the serial data output from LED lighting driver 650 is provided to shift register 770. The serial output of shift register 770 is provided to the input of demultiplexer 624. Selected intermediate signals of shift register 770 are processed by logic 760 to produce the one or more control signals to be supplied to selector input 625 of demultiplexer 624 for controlling the demultiplexing operation of demultiplexer 624.

Figure 8:
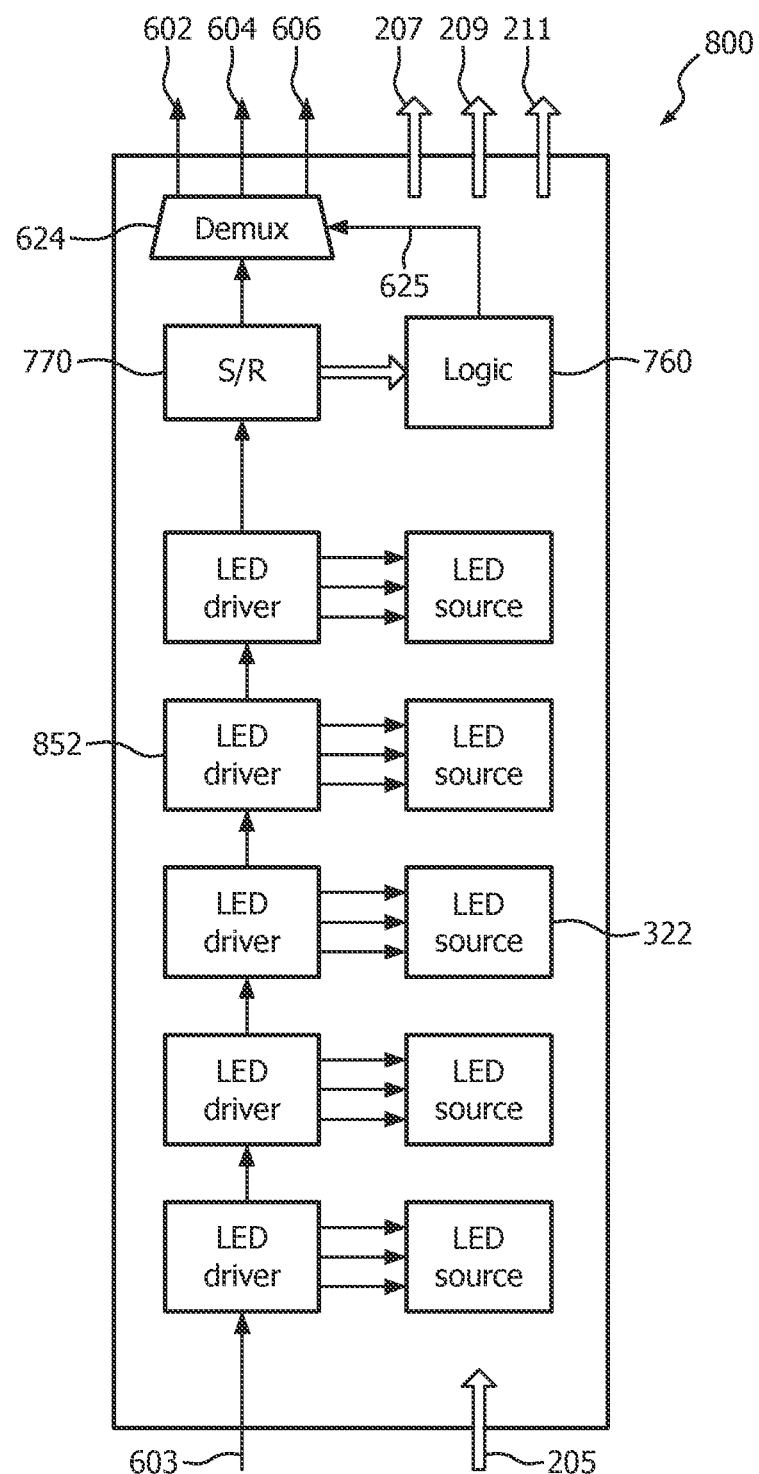
FIG. 8 illustrates another example embodiment of a lighting unit configured as an LED light string.

FIG. 8 illustrates another example embodiment of a lighting unit 800 configured as an LED light string. Lighting unit 800 includes serial data input 603, first, second and third demultiplexed serial data outputs 602, 604 and 606, a plurality of individually addressable light LED-based light sources 322, a plurality of LED lighting drivers 852, logic 760, shift register 770, and demultiplexer 624. Lighting unit 800 also includes a power input 205 and first, second and third power outputs 207, 209 and 211. In some embodiments first, second and third power outputs 207, 209 and 211 may be omitted.

Lighting unit 800 is similar to lighting unit 700, and so only differences in the construction and operation will be described.

In lighting unit 800, each of the LED-based light sources 322 is driven by its own corresponding LED lighting driver 852, with the output of a preceding lighting driver 852 being connected to an input of a subsequent lighting driver 852 in the string. That is, serial data (and an associated clock) is output from each preceding lighting driver 852 to each subsequent lighting driver 852 in the lighting unit 800. More specifically, the lighting driver 852 for the first LED-based light source 322 has a serial data input and a clock input for receiving serial data from a controller, such as controller 110 in FIG. 1. The lighting driver lighting driver 852 for the first LED-based light source also has a serial data output and a clock output which are connected to a data input and clock input of the lighting driver 852 for the second LED-based light source 322. Similarly, the lighting driver 852 for the second LED-based light source 322 has a serial data input and a clock input for receiving serial data from the first lighting driver 852. The lighting driver 852 for the second LED-based light source 322 also has a serial data output and a clock output which are connected to a serial data input and clock input of the lighting driver 852 for the third LED-based light source 322, and so on throughout lighting unit 800.

Figure 9:
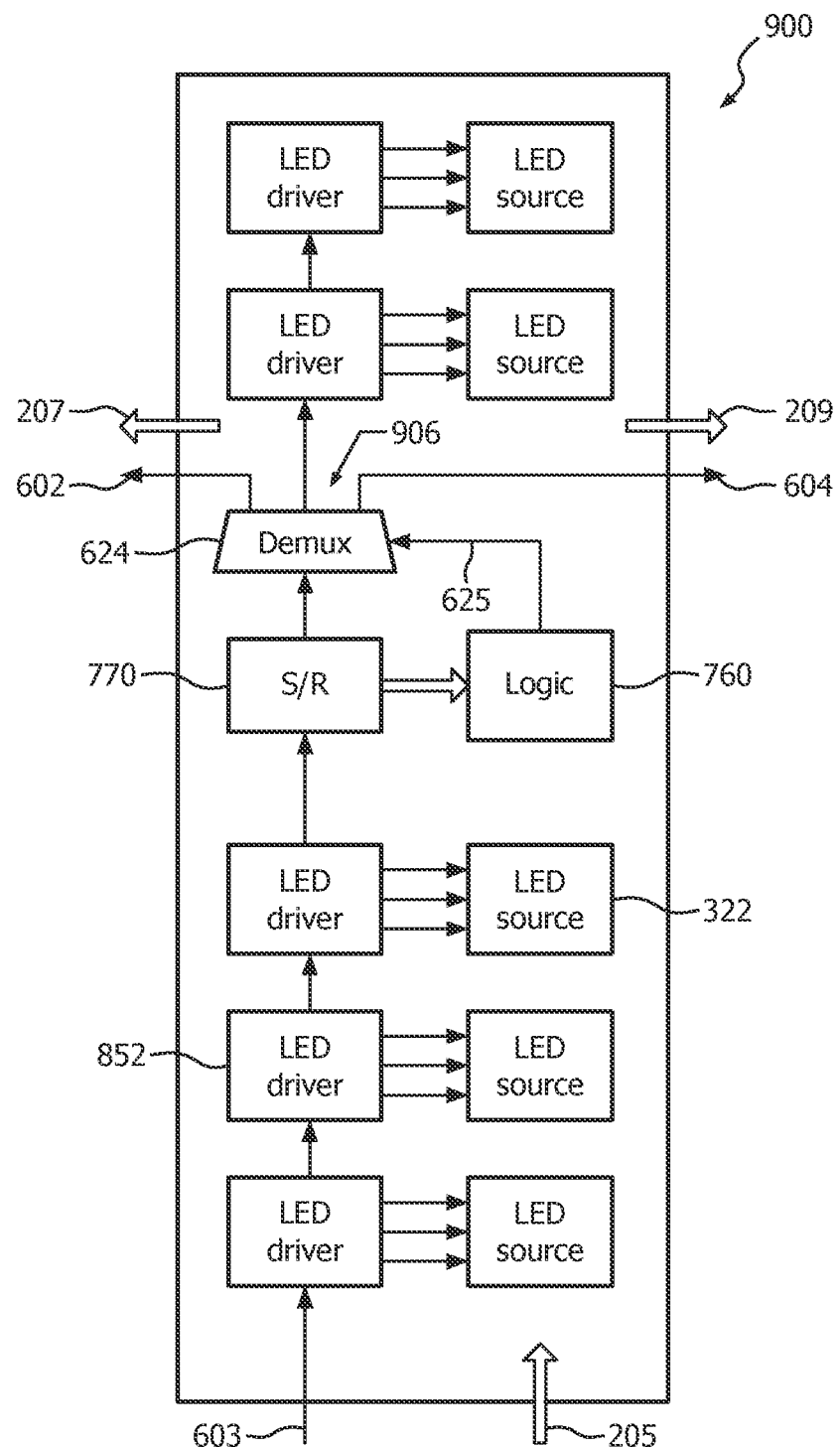
FIG. 9 illustrates another example embodiment of a lighting unit configured as an LED light string.

FIG. 9 illustrates another example embodiment of a lighting unit 900 configured as an LED light string. Lighting unit 900 includes serial data input 603, first and second demultiplexed serial data outputs 602 and 604, a plurality of individually addressable light LED-based light sources 322, a plurality of LED lighting drivers 852, logic 760, shift register 770, and demultiplexer 624. Lighting unit 800 also includes a power input 205 and first, second and third power outputs 207, 209 and 211. In some embodiments first, second and third power outputs 207, 209 and 211 may be omitted.

Lighting unit 800 is similar to lighting unit 700, and so only differences in the construction and operation will be described.

In particular, there are two major differences between lighting unit 800 and lighting unit 700. First, in lighting unit 900 shift register 770 and demultiplexer 624 are arranged in the light string between two of the lighting drivers 852. In that case, one of the outputs 906 of demultiplexer 624 is coupled to an input of a subsequent lighting driver 852, and two of the outputs are provided as demultiplexed serial data outputs 602 and 604 of lighting unit 900.

It should be understood that many variations of the specific configurations of lighting units shown in FIGS. 2, 3, 6, 7, 8, and 9 are possible. For example, in some embodiments the shift register in FIGS. 8 and 9 may be omitted, and an output of one of the LED lighting drivers 852 may be used to produce the instead employed to control the demultiplexing operation of demultiplexer 624. In particular, the red, green and blue drive outputs of one of the LED lighting drivers 852 may be provided to logic circuitry 660 to produce one or more control signals which are provided to a selector input 625 of demultiplexer 624 for controlling the demultiplexing operation of demultiplexer 624.

Figure 10A:
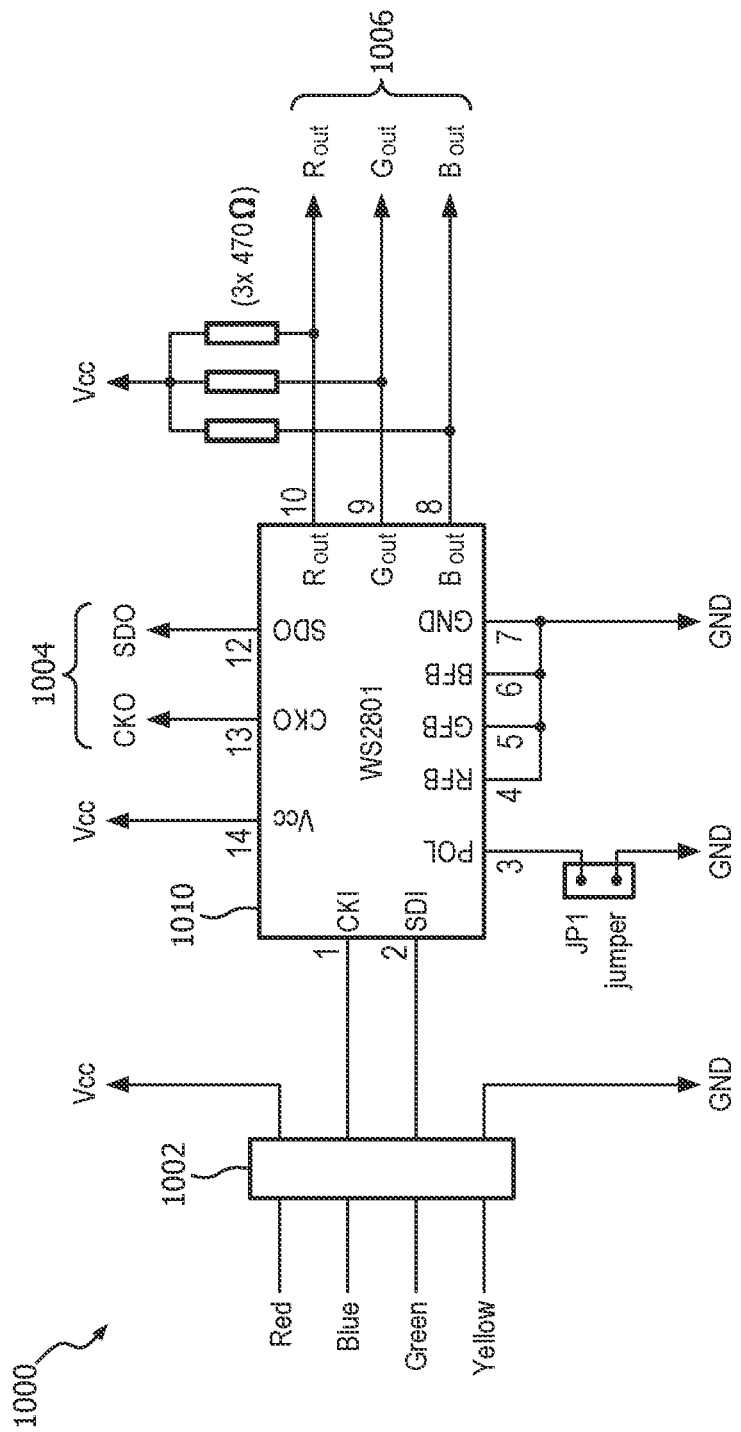
FIG. 10A illustrates an example embodiment of an LED driver for an LED light string.
Figure 10B:
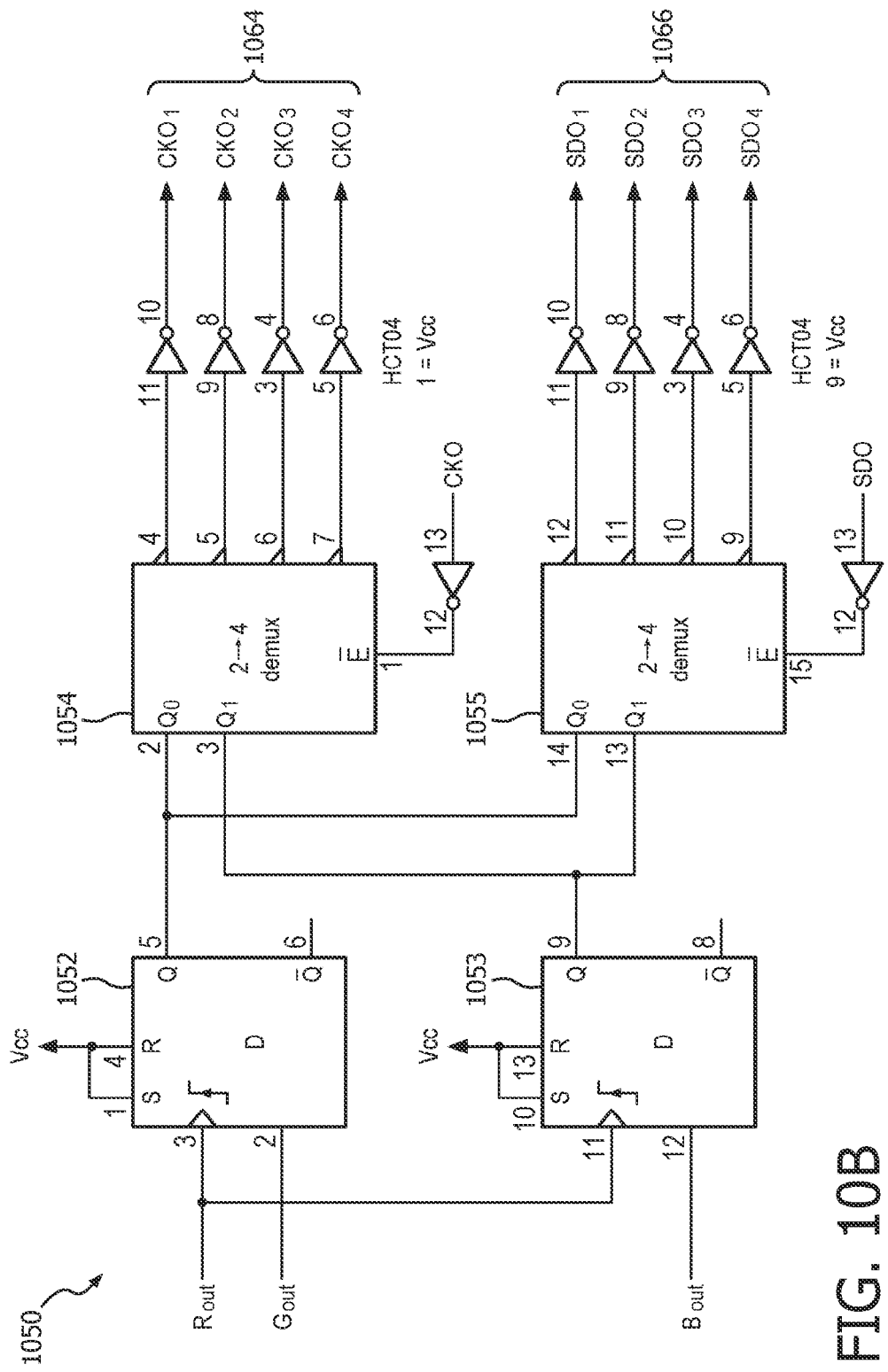
FIG. 10B illustrates an example embodiment of a demultiplexer for an LED light string.

FIGS. 10A and 10B illustrate an example embodiment wherein an LED lighting driver is combined with logic to decode the serial digital signal and control a demultiplexer to forward lighting data for subsequent LEDs (which for example may belong to separate lighting units) and to generate pulse width modulated (PWM) currents for a connected LED-based light source having red, blue, and green LEDs. Here it is assumed that the PWM signals are synchronized (have a fixed phase difference), in which case two or more of such signals can be used to drive the selector of the demultiplexer by using one of the signals to sample the other signal(s). These signals are then used to drive the selector of the demultiplexer to control the demultiplexing operation.

FIG. 10A illustrates an example embodiment of an LED driver 1000 for an LED light string. LED driver 1000 includes a serial data input 1002 and a serial data output 1004 and PWM current outputs 1006 for driving red, green, and blue LEDs. LED driver 1000 includes an LED driver integrated circuit 1010 (e.g., a WS2801 integrated circuit from WorldSemi). LED driver 1000 may be employed as a lighting driver in various embodiments of a lighting unit as described above, particularly lighting units 100, 800 and 900 (e.g., as LED lighting driver 852).

FIG. 10B illustrates an example embodiment of a logic circuit and demultiplexer 1050 for an LED light string. Here logic circuit and demultiplexer 1050 includes D flip-flops 1052 and 1053 and 2-to-4 demultiplexers 1054 and 1055, outputting four demultiplexed serial data outputs 1062 and corresponding demultiplexed clock signals 1064.

Operationally, serial data input 1002 is an input of a serial data bus with two wires (clock and data). The serial data is decoded by LED driver IC 1010, the Rout signal of which is used to sample Gout and Bout via D flip flops 1052 and 1054. The sampled signals are then fed to demultiplexers 1054 and 1055, one for each of the wires of the serial protocol (i.e., clock and data) to produced the demultiplexed outputs 1062 and 1064.

Figure 11:
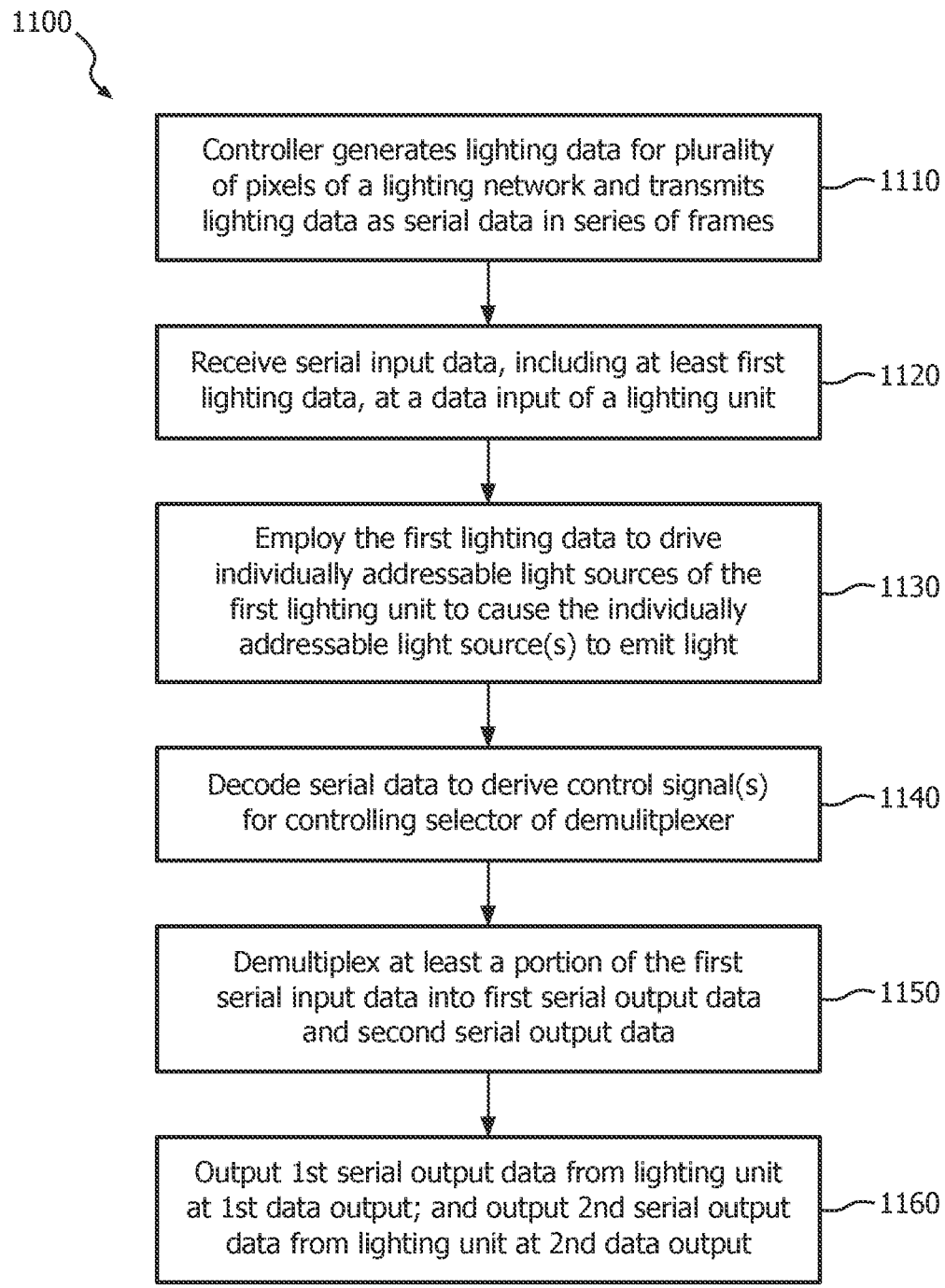
FIG. 11 illustrates one embodiment of a method of operating a lighting network having split light strings.

FIG. 11 illustrates one embodiment of a method 1100 of operating a lighting network having split light strings, such as have been described above.

In an operation 1110, a controller generates lighting data for a plurality of pixels of a lighting network and transmits the lighting data as serial data in a series of lighting frames, each of which includes one data packet for each pixel of the lighting network.

In an operation 1120, a lighting unit receives first serial input data, including at least first lighting data, at a data input of the lighting unit.

In an operation 1130, the lighting unit employs the first lighting data to drive individually addressable light sources of the lighting unit to cause the individually addressable light source(s) to emit light.

In an operation 1140, the lighting unit decodes serial data to derive control signal(s) for controlling a selector of a demultiplexer.

In an operation 1150, the demultiplexer demultiplexes at least a portion of the first serial input data into first serial output data and second serial output data.

In an operation 1160, the lighting unit outputs first serial output data from the lighting unit at a first data output, an outputs second serial output data from lighting unit at a second data output.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein.

In particular, a demultiplexer apparatus for splitting strings of a lighting network may be provided based on any of the principles described above without including any actual pixels or lighting devices in the apparatus.

More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A lighting network including at least a first lighting unit, the first lighting unit comprising:
   a serial data input configured to receive first serial input data including at least first lighting data;
   at least first and second demultiplexed serial data outputs;
   one or more individually addressable light sources;
   one or more lighting drivers configured to receive the first lighting data and in response thereto to drive the one or more individually addressable light sources to emit light; and
   a demultiplexer configured to demultiplex at least a portion of the first serial input data into first serial output data and second serial output data, and connected to supply the first serial output data to the first demultiplexed serial data output to be output from the first lighting unit, and to supply the second serial output data to the second demultiplexed serial data output to be output from the first lighting unit.

2. The lighting network of claim 1, wherein the one or more individually addressable light sources comprises a plurality of individually addressable light sources, and wherein the one or more lighting drivers comprises a plurality of lighting drivers connected in series to the serial data input, each of the lighting drivers being configured to drive a corresponding one of the individually addressable light sources.

3. The lighting network of claim 2, further comprising a shift register having a serial input connected to an output of one of the lighting drivers and having a serial output connected to an input of the demultiplexer to supply the portion of the first serial input data to the demultiplexer.

4. The lighting network of claim 3, further comprising a logic circuit has one or more inputs connected to one or more intermediate output signals of the shift register and has an one or more outputs connected to control the demultiplexer to demultiplex the portion of the first serial input data into the first serial output data and the second serial output data.

5. The lighting network of claim 1, wherein the one or more individually addressable light sources comprises a plurality of individually addressable light sources, and wherein the one or more lighting drivers comprises at least one lighting driver which has a plurality of driver outputs which are each configured to drive one of the individually addressable light sources to emit light.

6. The lighting network of claim 5, further comprising a logic circuit, wherein the at least one lighting driver includes a serial output connected to an input of the demultiplexer, wherein the logic circuit has one or more inputs connected to one of the driver outputs and has an one or more outputs connected to control the demultiplexer to demultiplex the portion of the first serial input data into the first serial output data and the second serial output data.

7. The lighting network of claim 1, wherein the one or more individually addressable light sources comprises a plurality of individually addressable light sources, and wherein the individually addressable light sources each comprise a light emitting diode (LED) light source.

8. The lighting network of claim 7, wherein the LED light sources each comprise three LEDs which are configured to emit light at different colors from each other, and wherein the first lighting data includes individual LED data for controlling an intensity of each of the three LEDs of each of the LED light sources.

9. The lighting network of claim 1, further comprising:
   a second lighting unit having a serial data input connected to the first demultiplexed serial data output of the first lighting unit to receive the first serial output data, wherein the first serial output data includes second lighting data, and wherein the second lighting unit comprises:
      one or more individually addressable light sources, and
      one or more second lighting drivers configured to receive the second lighting data and in response thereto to drive the one or more individually addressable light sources of the second lighting unit to emit light; and
   a third lighting unit having a serial data input connected to the second demultiplexed serial data output of the first lighting unit to receive the second serial output data, wherein the second serial output data includes third lighting data, and wherein the third lighting unit comprises:
      one or more individually addressable light sources, and
      one or more third lighting drivers configured to receive the third lighting data and in response thereto to drive the one or more individually addressable light sources of the third lighting unit to emit light.

10. The lighting network of claim 9, further comprising a controller connected to the serial data input of the first lighting unit, wherein the controller is configured to generate the first, second, and third lighting data for the first, second, and third lighting units and to transmit the first, second, and third lighting data to the first lighting unit as the first serial input data.

11. The lighting network of claim 10, wherein the first, second, and third lighting units each include a power input configured to receive power for operating first, second, and third lighting units, respectively, wherein the first lighting unit includes first and second power outputs, and wherein the first power output of the first lighting unit is connected to the power input of the second lighting unit and the second power output of the first lighting unit is connected to the power input of the third lighting unit.

12. A method, comprising:
   receiving first serial input data, including at least first lighting data, at a data input of a first lighting unit;

employing the first lighting data to drive one or more individually addressable light sources of the first lighting unit to cause the one or more individually addressable light sources to emit light;

demultiplexing at least a portion of the first serial input data into first serial output data and second serial output data;

outputting the first serial output data from the first lighting unit at a first demultiplexed serial data output; and outputting the second serial output data from the first lighting unit at a second demultiplexed serial data output.

13. The method of claim 12, wherein a plurality of lighting drivers are connected in series to the serial data input, the method including each of the lighting drivers driving a corresponding one of the individually addressable light sources.

14. The method of claim 13, further comprising employing one or more intermediate output signals of a register to control the demultiplexer to demultiplex the portion of the first serial input data into the first serial output data and the second serial output data.

15. The method of claim 12, further comprising one lighting driver, which has a plurality of driver outputs driving each of the plurality of the individually addressable light sources via one of the driver outputs, further comprising employing a logic circuit and a demultiplexer, wherein the logic circuit has one or more inputs connected to one of the driver outputs and has an one or more outputs, the method comprising the lighting driver providing the portion of the first serial input data to an input of the demultiplexer, and the logic circuit controlling the demultiplexer to demultiplex the portion of the first serial input data into the first serial output data and the second serial output data.

16. The method of claim 12, further comprising one lighting driver which has a plurality of driver outputs driving each of the plurality of the individually addressable light sources via one of the driver outputs.

17. The method of claim 16, further comprising employing a logic circuit and a demultiplexer, wherein the logic circuit has one or more inputs connected to one of the driver outputs and has an one or more outputs, the method comprising the lighting driver providing the portion of the first serial input data to an input of the demultiplexer, and the logic circuit controlling the demultiplexer to demultiplex the portion of the first serial input data into the first serial output data and the second serial output data.

18. The method of claim 12, further comprising:
a second lighting unit receiving at a serial data input thereof the first serial output data of the first lighting unit, wherein the first serial output data includes second lighting data;

the second lighting driving one or more individually addressable light sources of the second lighting unit to emit light;

a third lighting unit receiving at a serial data input thereof the second serial output data of the first lighting unit, wherein the second serial output data includes third lighting data; and the third lighting driving one or more individually addressable light sources of the third lighting unit to emit light.

19. The method of claim 18, wherein the first, second, and third lighting units each include a power input, and the first lighting unit includes first and second power outputs, the method including the first lighting input supplying power from the first power output to the power input of the second lighting unit, and the first lighting input supplying power from the second power output to the power input of the third lighting unit.

20. An apparatus, comprising:
a serial data input configured to receive serial input data including lighting data for a plurality of individually addressable light sources;

at least first and second demultiplexed serial data outputs;

a demultiplexer having one or more control inputs, a serial input, and at least first and second demultiplexer outputs; and a control device having one or more control outputs connected to the one or more control inputs of the demultiplexer, the control device being connected to produce one or more control signals in response to the serial input data and to supply the one or more control signals to the demultiplexer, wherein the demultiplexer is configured, in response to the one or more control signals, to demultiplex at least a portion of the serial input data into first serial output data and second serial output data, and to supply the first serial output data to the first demultiplexed serial data output to be output from the first lighting unit, and to supply the second serial output data to the second demultiplexed serial data output to be output from the first lighting unit.

* * * * *